United States Patent [19]

Gerding et al.

[11] 4,092,711

[45] May 30, 1978

[54] POWER SUPPLY WITH AUTOMATIC SHUTDOWN

[75] Inventors: James H. Gerding, Framingham; Albert M. Heyman, Bedford, both of Mass.

[73] Assignee: Honeywell Information Systems Inc., Waltham, Mass.

[21] Appl. No.: 755,393

[22] Filed: Dec. 29, 1976

[51] Int. Cl.² .................................................. H02M 1/18
[52] U.S. Cl. ............................................. 363/53; 363/89
[58] Field of Search ............................... 321/11, 14, 18; 340/248 R, 248 B, 248 C; 363/52, 53, 84, 89

[56] References Cited

U.S. PATENT DOCUMENTS

| | | | |
|---|---|---|---|
| 3,341,748 | 9/1967 | Kammiller | 340/248 C |
| 3,457,560 | 7/1969 | McKinley | 340/248 C |
| 3,505,663 | 4/1970 | Yule | 340/248 C |
| 3,571,707 | 3/1971 | Houck | 340/248 C |
| 3,789,242 | 1/1974 | Cantor | 340/248 C X |
| 3,795,905 | 3/1974 | Wright | 340/248 C X |
| 3,836,854 | 9/1974 | Wehman | 340/248 C X |
| 3,918,043 | 11/1975 | Beck | 340/248 B |

Primary Examiner—William M. Shoop
Attorney, Agent, or Firm—Ronald T. Reiling; Nicholas Prasinos; William F. White

[57] ABSTRACT

A power supply provides a low-level DC voltage to DC load circuits by first rectifying the standard AC voltage and thereafter reducing the rectified AC voltage to the low-level DC voltage. The reduction of the rectified AC voltage to the low-level DC voltage is accomplished by a power transformer which is switched on or off by a pair of switching transistors. The switching transistors are operated in a "push-pull" mode by a pair of control transformers operating in combination with a control circuit. The control circuit produces various pulse conditions in the control transformers which turn their respective switching transistors on and off in a prescribed manner. An overcurrent sensing and control device prevents damage to components. The power on/fail circuit signals the load as to the status of the regulated load voltage and guarantees power for orderly shutdown after an input power outage.

15 Claims, 9 Drawing Figures

TEMPERATURE COMPENSATION

POWER SUPPLY WITH AUTOMATIC SHUTDOWN

RELATED APPLICATIONS

U.S. Patent Application entitled "Power Supply With Base Drive Control" by James H. Gerding and Albert M. Heyman, filed on even date herewith, and assigned to the same assignee as named herein, describes a power supply which utilizes a pair of switching transistors in conjunction with a relatively small transformer so as to regulate the high frequency power transformer process.

U.S. Patent Application entitled "Power Supply With Overcurrent Protection" by James H. Gerding and Albert M. Heyman, filed on even date herewith, and assigned to the same assignee as named herein, describes the overcurrent sensing and control circuit using the above power supply in the preferred embodiment.

BACKGROUND OF THE INVENTION

1. Field of the Invention

This invention relates generally to signalling the load that the load voltage is in regulation. In particular, this invention signals the load that there is a power outage and guarantees sufficient power for an orderly shutdown. The load is a digital computing system and the signal is a logic level which causes a priority interrupt.

2. Description of the Prior Art

Most electronic devices operate from an AC power source of either 110 volts and 60 hertz, or 220 volts and 50 hertz. It is often the case that these electronic devices must in turn produce a constant low-level DC power. This is most often accomplished by an internal power supply which first converts the AC power to a high-level voltage which is subsequently converted to a lower level voltage.

The conversion from high-level DC voltage to low level DC voltage is often accomplished by applying the higher level DC voltage to the primary winding of a step-down transformer. The application of high-level DC voltage is moreover usually accomplished at a high frequency so as to cut down on the size and weight of the step-down transformer. Such a high frequency application to the relatively small transformer core can result in magnetic saturation unless the magnetic energy in the core is released by an opposite or cancelling flux. This is usually accomplished by closely regulating the high frequency application of the DC voltage level so as to allow for the subsequent cancellation of the magnetic flux build-up prior to saturation.

The prior art has the problem that in the event of an overcurrent condition, the main power transformer goes into saturation with ensuing collector current spikes of the switching transistors. These spikes degrade the switching transistor life.

Also, the prior art monitors the AC line voltage and trips a one-shot if there is a voltage outage. Such prior art systems attempt to monitor an AC power outage at the AC input. Such systems are susceptible to minor fluctuations in AC line voltage so as to thereby result in frequent shutdowns. This has somewhat been alleviated by providing one-shot cycles which provide for an orderly shutdown only if the AC line voltage is still out at the end of the one-shot cycle. These systems nonetheless trigger premature shutdowns which may not be yet necessary at the various critical load points wherein power is being supplied.

OBJECTS OF THE INVENTION

It is an object of this invention to provide a new and improved power supply.

It is another object of this invention to provide improved control over the output of a power supply.

It is still another object of this invention to provide an improved method of monitoring an AC power source outage.

It is still another object of this invention to provide an improved method of detecting a regulated load voltage drop-off.

It is a still further object of this invention to provide a monitor for AC power outage wherein the monitor is located downstream of the AC line voltage.

SUMMARY OF THE INVENTION

The above objects are achieved according to the present invention by a power supply which receives a standard AC power source. The power supply is operative to first rectify the AC voltage and thereafter step down the resulting DC voltage level to an appropriate low-level DC voltage. The rectified voltage is thereafter applied to the primary winding of a step-down transformer under the control of a high frequency switch. The secondary windings of the transformer constitute parts of one or more circuits which filter and average the voltage induced across the secondary windings so as to obtain a constant low-level DC output voltage. The high frequency switch controls the application of the rectified DC voltage to the primary winding of the step-down transformer in accordance with the sensing of the low-level DC output voltage. Magnetic saturation of the transformer core is prevented by not allowing any net direct current through the primary winding of the step-down transformer.

In today's competitive computer environment, computing systems must operate in higher temperature environments than did systems in the past. This requires that in new designs the minimum off-time (the minimum time the switching transistors are both off) be increased at higher ambients.

Without the temperature compensating circuits, the minimum off-time must be set much higher thereby reducing power supply ride through. Ride through is the ability of the power supply to keep its outputs in regulation during the periods of time in which input AC voltage is removed and no "power fail" signal issued.

Temperature compensation in this invention greatly reduces the probability of component failure during start-up in a high ambient temperature environment.

This invention also results in lower ride through during shutdown at very high ambient temperatures because the temperature compensation circuits double the switching transistor off-time. This prevents catastrophic failure of the switching transistors at the highest ambient.

This invention also prevents the output transformer from saturating by slowly increasing the volt-microsecond stress (pulse width) when turning on again after an overcurrent condition condition.

This invention provides for the monitoring of the rectified output transformer secondary winding voltage. It gives more accurate control over the ride through by anticipating the exact moment load voltages lose regulation and signals the digital computing system using this power supply to go into an orderly shutdown mode.

This invention also gives the system more ride through and enables the system to be operative over longer intervals of line outage for varying loads.

DESCRIPTION OF THE PREFERRED EMBODIMENT

Figure 1:
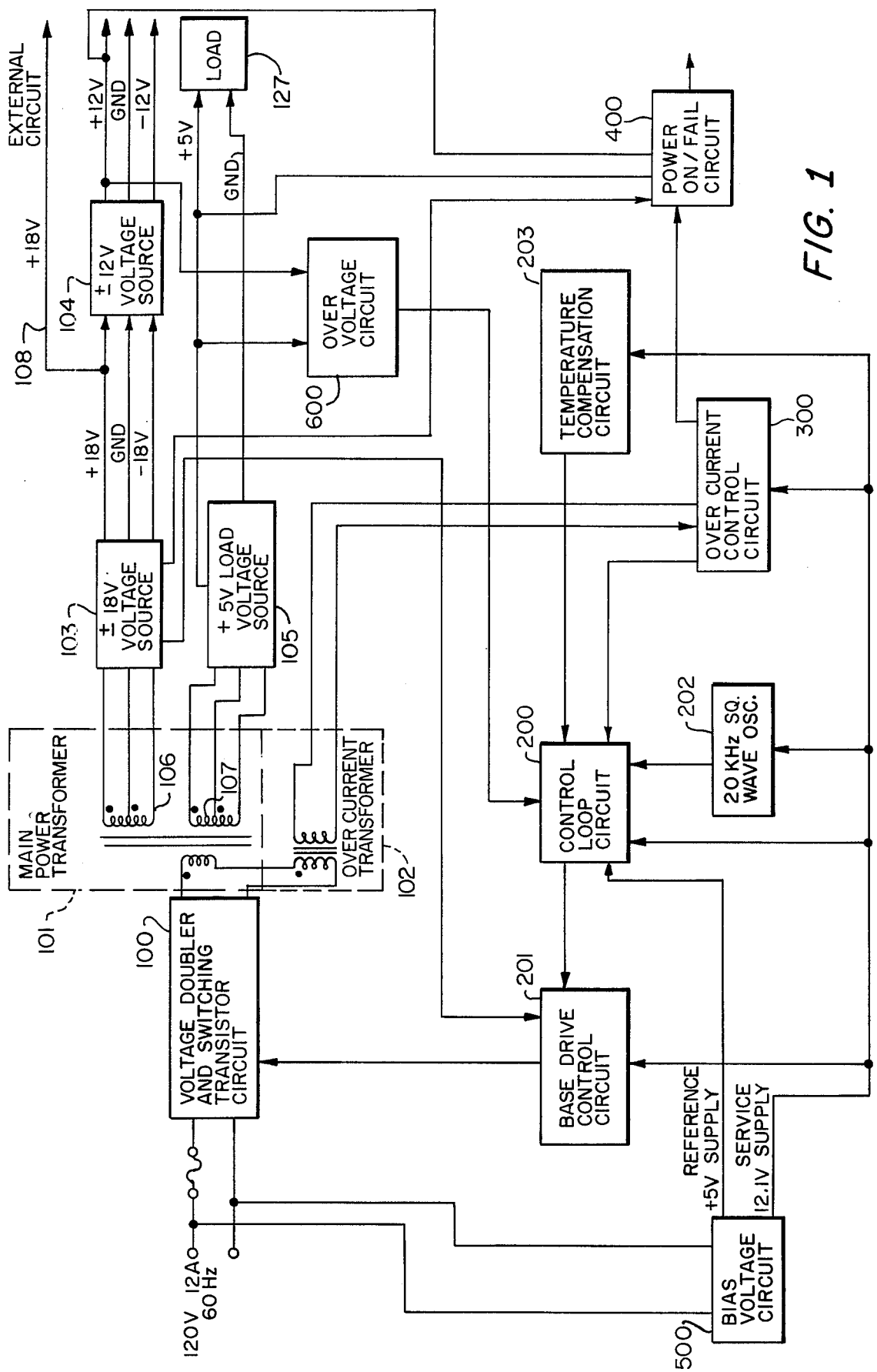
FIG. 1 illustrates the overall configuration of the power supply.

FIG. 1 is a general block diagram of the power supply. The primary source 120V 12A 60 hertz inputs the voltage doubler and switching transistor circuits 100 and the bias voltage circuits 500.

The chopped output of the voltage doubler and switching transistor circuits 100 passes through the primary windings of the main power transformer 101 and the overcurrent transformer 102. The secondary winding 106 of the main power transformer 101 inputs into the ±18V voltage source 103. The ±18V voltage source 103 feeds the ±12V voltage source 104. The ±18V voltage source 103 and ±12V voltage source 104 are made up of conventional circuits. Since they are not pertinent to the invention, they will not be described in detail.

The output of main power transformer 101, appearing in the secondary winding 107, is rectified and filtered in ±5V load voltage source 105 to provide ±5 volts for the load 127.

The secondary winding output of overcurrent transformer 102 is sensed by overcurrent circuit 300 which signals the control loop circuit 200 of an overcurrent condition.

The overvoltage circuits 600 monitor the +5V and +12V outputs of +5 load voltage source 105 and ±12V voltage source 104 and signal the control loop circuits 200 when an overvoltage condition occurs. Since the overvoltage circuits 600 are not pertinent to this invention, they will not be described in further detail.

The power on/fail circuit 400 signals that the voltage outputs are in regulation. If the voltage doubler and switching transistor circuit 100 are out of tolerance, the power on/fail circuit 400 signals that the +5V, the ±12V and ±18V will shut down into two milliseconds. The signal is given by logic level signal power on/fail signal 406.

The temperature compensation circuit 203 senses the ambient temperature and signals the control loop circuits 200. This will also be described in detail hereinafter.

Figure 4:
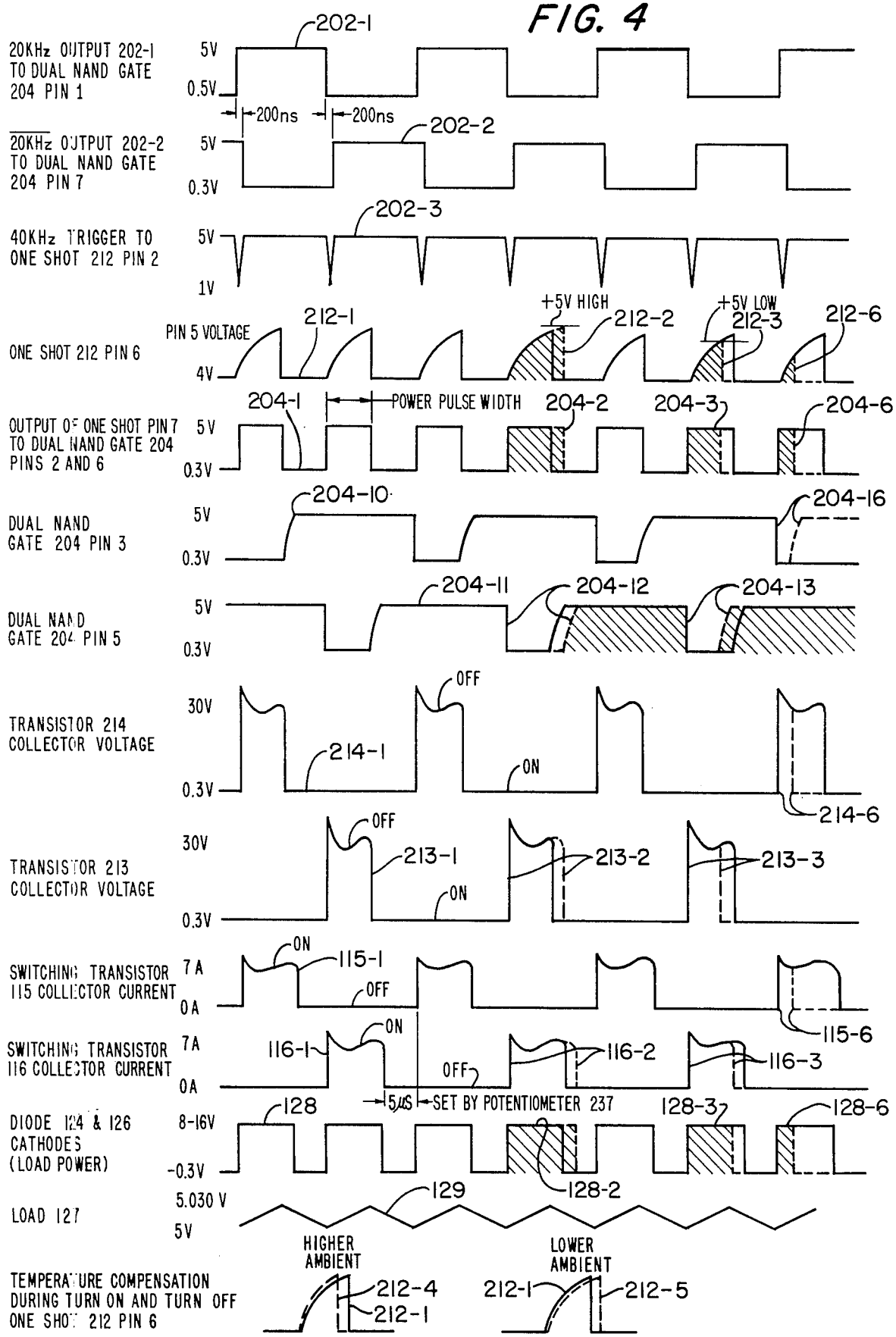
FIG. 4 illustrates the pertinent timing of the power supply.

The bias voltage circuit 500 takes the 120V input voltage, steps it down, rectifies and filters it, and generates a +12.1V service supply to the control loop circuit 200, the base drive control circuit 201, the 20KHz square wave oscillator 202, overcurrent circuit 300 and the temperature compensation circuit 203. Also, the bias voltage circuit 500 generates the +5V reference supply to feed the control loop circuit 200. The 20KHz square wave oscillator 202 feeds the control loop circuit 200 with three wave shape signals. FIG. 4 shows these three signals 202-1, 202-2 and 202-3 which will be explained in more detail below.

Figure 2:
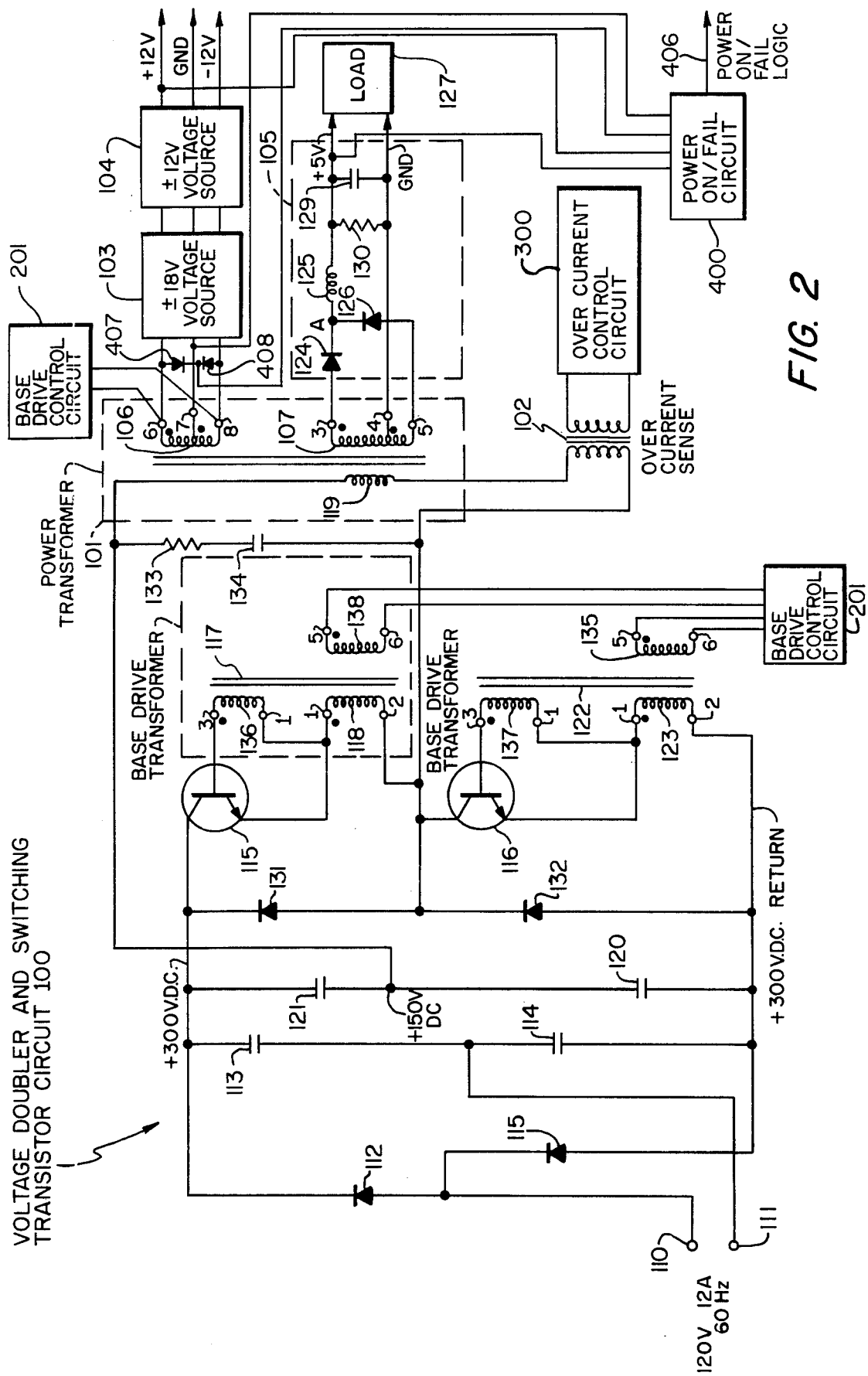
FIG. 2 illustrates the voltage doubler and 20KHz chopper circuits and the main power transformer.

The base drive control circuit 201 controls the timing of the switching transistors 115 and 116, FIG. 2, in the voltage doubler and switching transistor circuits 100. Wave shapes 115-1 and 116-1 of FIG. 4 show the timing of these switching transistors 115 and 116, FIG. 2.

The control loop circuit 200 controls the timing of the base drive control circuit 201. This is described in detail in FIG. 3.

The control loop circuit 200 receives input signals from the temperature compensation circuit 203, the overvoltage circuit 600, and the overcurrent circuit 300, which adjusts the timings in control loop circuit 200. These changes in timings are reflected in the base drive control circuit 201, the voltage doubler and switching transistor circuits 100 and ultimately in the +5V load voltage source 105.

FIG. 2 shows the voltage doubler and switching transistor circuits 100. The 120V 60Hz input voltage comes in on lines 110 and 111. When the AC voltage on line 110 is positive, the current will proceed from line 110 through diode 112, capacitor 113 and back on line 111. Assuming a negative voltage on input line 110, the current will flow from input line 111, through capacitor 114, diode 115 and back on line 110. In this manner, either capacitor 113 or 114 is separately charged depending upon the polarity of the AC voltage applied to the input lines 110 and 111. The resulting voltages across capacitors 113 and 114 combine to form a constant DC voltage equal to approximately twice the peak AC voltage on the input lines 110 and 111. This DC voltage of approximately 300 volts provides an energy source for the switching power supply and supplies the ride through energy to allow an orderly shutdown after a power outage.

The circuit which provides control of switching transistors 115 and 116 and energy through the primary coil 119 of power transformer 101 is connected as follows. Capacitors 120 and 121 appear in series across the +300V DC line. Also, diodes 131 and 132 also appear in series across the +300V DC line. One terminal of the primary coil 119 of power transformer 101 connects to the junction of capacitors 120 and 121. The other terminal connects to one terminal of the primary winding of overcurrent transformer 102. The other terminal of the primary winding of overcurrent transformer 102 connects to the junction of diodes 131 and 132. A resistor 133 and a capacitor 134 are in series and connected across primary winding 119 of power transformer 101 and the primary winding of overcurrent transformer 102. The collector of switching transistor 115 connects to the +300V DC line. The base connects to terminal 3 of winding 136 of base drive transformer 117. The emitter connects to terminal 1 of the junction of windings 118 and 136 of base drive transformer 117. Terminal 2 of winding 118 connects to the junction of diodes 131 and 132 as does the collector of switching transistor 116.

The base connects to terminal 3 of winding 137 of base drive transformer 122. The emitter connects to terminal 1, the junction of windings 137 and 123 of base drive transformer 122. Terminal 2 of winding 123 connects to +300V DC return.

In FIG. 2, when switching transistor 115 is conducting, the circuit is completed from the +300V DC line, switching transistor 115, coil 118 of base drive transformer 117, primary winding 119 of output power transformer 101, and the primary winding of overcurrent transformer 102 to the junction of capacitors 120 and 121 (+150V DC). When switching transistor 116 is conducting, the circuit is completed from the junction of capacitors 120 and 121, primary winding 119 of power transformer 101, the primary winding of overcurrent transformer 102, switching transistor 116, coil 123 of base drive transformer 122 to the +300V DC return. Capacitors 120 and 121 are in series and split the +300V DC to +150V DC across each capacitor. They also isolate the circuit from any DC components preventing saturation of the main power transformer 101. Diodes 131 and 132 provide energy returns for the power transformer 101 during reduced output load conditions.

Resistor 133 and capacitor 134 provide a return path for the leakage inductance energy thereby preventing switching transistors 115 and 116 from being driven into the inverted transistor mode.

The +5V load voltage source 105 provides the +5V load voltage for a load 127. FIG. 2 shows the center tapped secondary winding 107 of power transformer 101. Terminals 3 and 5 of secondary winding 107 of power transformer 101 connect to the anodes of diodes 124 and 126 respectively. The cathodes of diodes 124 and 126 are connected in common to one side of an inductor 125. The other end of the inductor 125 connects to one end of the load 127. Terminal 4 of secondary winding 107 connects to the other end of load 127. A resistor 130 and a capacitor 129 are each in parallel with the load 127.

The center tapped secondary winding 107 of power transformer 101 steps down the voltage generated across primary winding 119. When terminal 3 of center tapped secondary winding 107 is positive, the circuit is completed through diode 124, inductor 125, through the load 127 to terminal 4. When terminal 5 of secondary winding 107 is positive, the circuit is completed through diode 126, inductor 125, through the load 127 back to terminal 4.

FIG. 4 wave shape 128 shows the voltage signal at point A, the junction of the cathodes of diodes 124 and 126. Wave shape 129 of FIG. 4 shows the voltage across the load 127 which is regulated by inductor 125 and capacitor 129.

Resistor 130 acts as a bleeder resistor for capacitor 129 under no load conditions.

Secondary winding 106 of power transformer 101 provides the input energy for the ±18V voltage source 103 which drives the ±12V voltage source 104.

Figure 3:
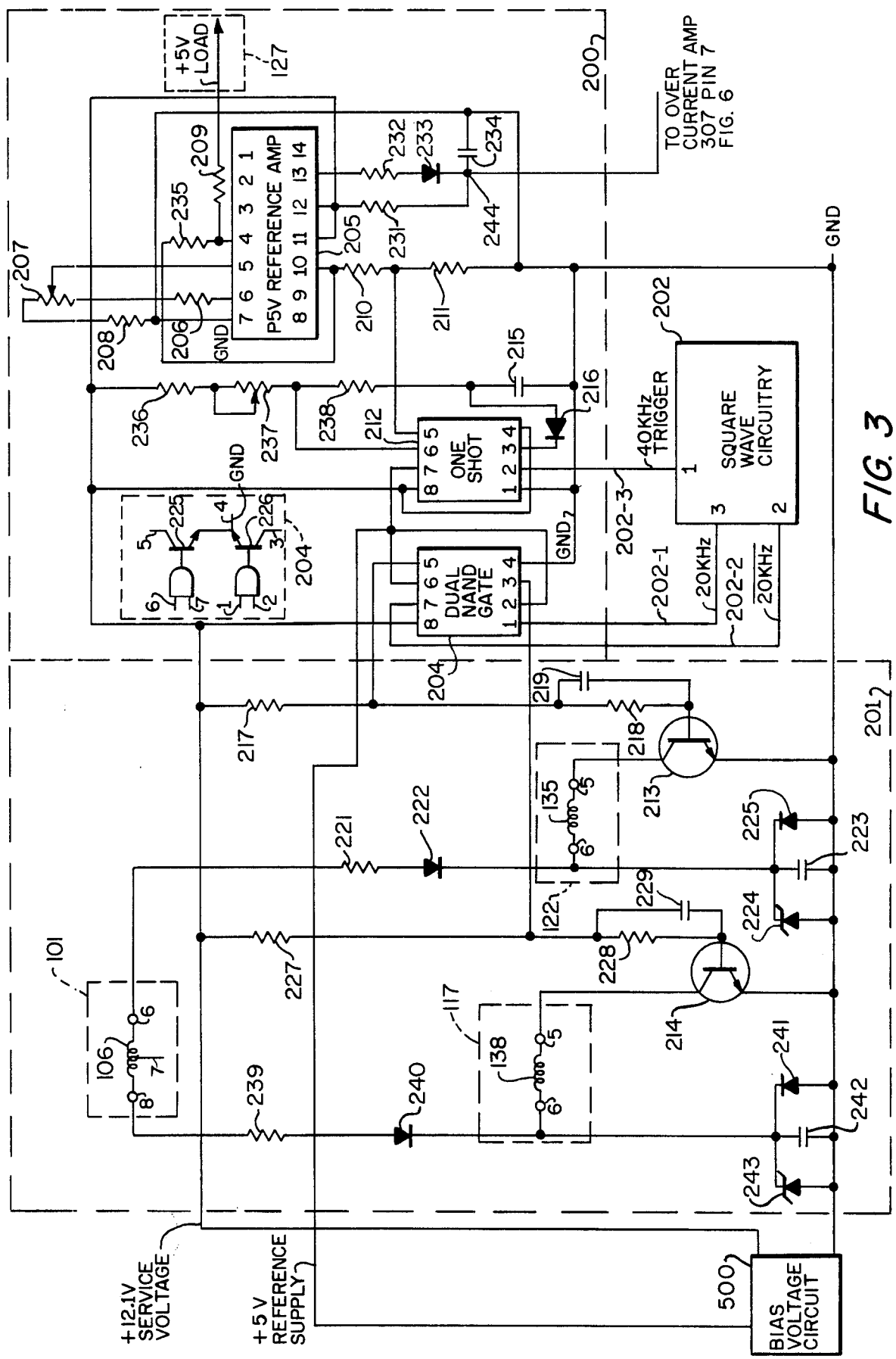
FIG. 3 illustrates the detailed circuitry of the control loop circuit, the base drive control circuit and the 20KHz square wave oscillator of FIG. 1.

FIG. 3 shows the control loop circuits 200, square wave circuitry 202 and the base drive control circuits 201. The power supply achieves the regulation of the +5V output to the load 127 by controlling the conduction time of the high voltage switching transistors 115 and 116, FIG. 2, by means of the control loop circuit 200 and the base drive control circuit 201.

FIG. 4 shows the timing diagrams of various points in the circuit which accomplish this control.

The square wave circuitry 202, FIG. 3, generates 3 outputs, a 20KHz square wave signal 202-1, a negated 20KHz (20KHz) square wave signal 202-2 delayed 200ns from the 20KHz square wave signal 202-1, and a 40KC trigger 202-3. The 20KHz signal 202-1 appears at pin 1 of one input of a NAND circuit of dual NAND gate 204. The 20KHz 202-2 appears at pin 7 of the other NAND circuit of dual NAND gate 204.

The dual NAND gate 204 with an open collector output is preferably a 75452 which is commercially available and fully described in the Integrated Circuits Catalog for Design Engineers (page 3–250) by Texas Instruments Inc. of Dallas, Texas. The other inputs on pins 2 and 6 of dual NAND gate 204 are formed as described hereinafter.

The P5V reference amplifier 205 is a commercially available voltage regulator L723-1 described fully in "The Voltage Regulator Applications Handbook", 1974, published by Fairchild Semiconductor, 464 Ellis Street, Mountain View, Calif. 94042. The P5V reference amplifier 205 has an internal differential amplifier. This differential amplifier compares the +5V power supply load 127 on pin 4 through a resistor 209 with a reference voltage generated internally in the P5V reference amplifier 205 and raises or lowers the output at pin 10 of the P5V reference amplifier 205. If the load 127 +5V decreased, the pin 10 voltage increases and vice versa.

In the P5V reference amplifier 205, pin 4 and pin 5 are inputs to the internal differential amplifier. The output of pin 6 is the internally generated reference voltage of 7.2V. Pin 7 is at ground. The 7.2V output of pin 6 is divided down through a resistor 206, a potentiometer 207, and a resistor 208 to ground. The potentiometer 207 is adjusted to set pin 5, one input to the differential amplifier, to +5V. The +5V load 127 is sensed at pin 4 through the biasing resistor 209. The ratio of resistor 235 and resistor 209 limits the gain of the differential amplifier. The output of pin 10 is divided down by resistors 210 and 211 to ground. The junction of resistors 210 and 211 varies between 2.3V and 7.5V as the +5V load 127 varies and appears at pin 5 of one-shot 212. The one-shot 212 is commercially available as a 555-2 timer described fully in the application "Signetics Digital Linear MOS Applications" 1974, by Signetics Corporation, 811 E. Arques Avenue, Sunnyvale, Calif. The DC voltage at pin 5 of one-shot 212 is used in this power supply to modify the duty cycle of switching transistors 115 and 116 of FIG. 2. Control is achieved by the output of pin 7 of one-shot 212 which is NANDed with the 20KHz signal 202-1 and the 20KHz signal 202-2 in dual NAND gate 204. The NAND outputs at pins 3 and 5 of dual NAND gate 204 control the duty cycle of transistors 213 and 214.

As stated above, the divided down output of pin 10 of the P5V reference amplifier 205 appears at pin 5 of one-shot 212 and varies inversely as the +5V load 127. The 40KHz trigger output 202-3 appears at pin 2 of one-shot 212. This negative-going signal (FIG. 4, 202-3) switches one-shot 212 pin 3 high and pin 7 open.

The control of one-shot 212 comes from the circuit of a resistor 236 connected to one side of a potentiometer 237 and also to its movable tap. The other side of potentiometer 237 connects to pin 6 of one-shot 212 and a resistor 238. The other side of resistor 238 connects to the junction of a capacitor 215 and the anode of a diode 216. The cathode of diode 216 connects to pin 3 of one-shot 212. The other side of capacitor 215 connects to ground.

Capacitor 215 charges from the network of +12.1V, resistor 236, the potentiometer 237, the resistor 238, the capacitor 215 to ground, until the voltage at pin 6 becomes greater than the control voltage of pin 5 of one-shot 212. FIG. 4 wave shape 212-1 shows the voltage at pin 6 of one-shot 212. Note that if the +5V to load 127 goes low (pin 4 of P5V reference amplifier 205) then the output, pin 10 of the reference amplifier goes high. This causes pin 5 of one-shot 212 to go high, causing capacitor 215 to charge for a longer time thereby keeping the one-shot 212 on for a longer time, shown by wave shape 212-2. As is shown below, this increases the duty cycle of switching transistors 115 and 116, FIG. 2, increasing the +5V at load 127.

Wave shape 212-3 shows the affect of the 5V load 127 being too high, then capacitor 215 charges for a lesser period of time decreasing the duty cycle of switching transistors 115 and 116, FIG. 2, thereby decreasing the +5V load 127.

Capacitor 215 is a commercially available temperature compensating capacitor. A preferred capacitor is that of No. 5016-N2200-43-1-J available from AVX Ceramics, Myrtle Beach, S.C. This capacitor 215 has a negative temperature coefficient of 2200 parts per million per ° C. At start-up with the ambient temperature high, the capacitance of capacitor 215 is decreased, decreasing the time constant of charge. This causes the voltage at pin 6 of one-shot 212 to reach the pin 5 voltage sooner decreasing the duty cycle of switching transistors 115 and 116, FIG. 2, as shown by wave shape 212-4, FIG. 4.

If the ambient temperature were low, the capacitance of capacitor 215 increases, increasing the time constant as shown in wave shape 212-5, FIG. 4, increasing the duty cycle of switching transistors 115 and 116, FIG. 2.

When one-shot 212, pin 6 voltage equals pin 5 voltage, the output pins 3 and 7 go to ground and remain at ground until the next 40KHz trigger pulse 202-3. Pin 3 going to ground discharges capacitor 215 through diode 216. The temperature affects on pulse width of the one-shot 212 are only in effect at maximum pulse width, or when the output of the P5V reference amplifier pin 10 is saturated high. At all other times, the power supply is in regulation and the pulse width supplied by the one-shot 212 is what is required to keep +5V load voltage at 5.0 volts.

The output of pin 7 of one-shot 212 appears at the input pins 2 and 6 of both NANDs of dual NAND gate 204 where it is NANDed with the 20KHz signal 202-1 on pin 1 and the 20KHz signal 202-2 on pin 7. The pin 3 output of dual NAND gate 204 controls transistor 214 and the pin 5 output controls transistor 213. FIG. 4 shows the wave shapes 204-1, 204-2, and 204-3 at pins 6 and 2, 3 and 5 respectively.

The circuit which controls transistor 213 is made up of a resistor 217 connected to a junction of one side of the parallel combination of a resistor 218 and a capacitor 219 and pin 5 of dual NAND gate 204. The other side of the parallel combination of resistor 218 and capacitor 219 connects to the base of transistor 213. The collector of transistor 213 is controlled by the circuit from terminal 7 to terminal 8 of secondary winding 106 of power transformer 101, a resistor 221, which connects to the anode of a diode 222. The cathode of diode 222 connects to the junction of terminal 6 of a secondary winding 135 of base drive transformer 122, the cathodes of a zener diode 224 and a diode 225 and a capacitor 223. The other side of the parallel combination of zener diode 224, diode 225 and capacitor 223 connects to ground. The other side of secondary winding 135, terminal 5 connects to the collector of transistor 213. The emitter of transistor 213 connects to ground.

Transistor 213 is biased "on" from 12.1V source supply, resistor 217, resistor 218, base of transistor 213, and emitter of transistor 213 to ground. Capacitor 219 charges through this circuit. When pin 5 of dual NAND gate 204 switches to ground, the current path through resistor 217 is now +12.1V, resistor 217, pin 5 of dual NAND gate 204, pin 4 to ground thereby shutting off transistor 213. Capacitor 219 discharges at this time decreasing the cut-off of transistor 213. FIG. 4 wave shape 213-1 shows the voltage at the transistor 213 collector. Just before transistor 213 shuts off, current is flowing through diode 225, winding 135 terminal 6, terminal 5, then through the collector of transistor 213 to ground. When transistor 213 shuts off, the voltage at terminal 5 of winding 135 becomes positive with respect to the voltage at terminal 6 because of the inductive energy in winding 135. This causes the voltage at FIG. 2 terminal 3 of winding 137 to become positive to the voltage at terminal 1. Therefore, the energy stored in winding 135 is transferred to winding 137 turning switching transistor 116 on. When switching transistor 116 turns on, the current path through winding 123 reinforces and provides the base drive to winding 137 to keep switching transistor 116 in saturation. Switching transistor 116 stays on as long as the pin 5 output of dual NAND gate 204 is at ground. FIG. 4 wave shape 116-1 shows the collector current of switching transistor 116.

As shown previously, switching transistor 116 FIG. 2 being "on" delivers power to load 127 through power transformer 101 secondary winding 107. During the "on" time of switching transistor 116, current from power transistor 101 secondary winding 106 pin 6 flows in FIG. 3 through resistor 221, diode 222, charging capacitor 223 to approximately 12-17V. Zener diode 224 limits the voltage across capacitor 223 to 17V maximum. Diode 225 clamps capacitor 223 to ground during discharge of capacitor 223.

When capacitor 215 is charged so that the voltage at pin 6 of one-shot 212 equals the voltage at pin 5, then the output of pin 7 goes to ground. This brings pin 6 of dual NAND gate 204 to ground, shutting off transistor 225 in dual NAND gate 204. The circuit is then completed from +12.1V, resistor 218 in parallel to capacitor 219 to the base of transistor 213, turning transistor 213 "on". Prior to transistor 213 turned on, capacitor 223 had been charged via resistor 221 and diode 222 to 12 to 17.0 volts DC. When transistor 213 turns on, the energy stored in capacitor 223 is transferred from transformer winding 135 of transformer 122 to winding 137 reverse biasing switching transistor 116 and shutting it off. (Terminal 3 of winding 135 is low at this time setting terminal 3 of winding 137 is low.) During the discharge of capacitor 223, diode 222 isolates capacitor 223 from the power transformer 101 circuits.

The circuit which controls transistor 214 is made up of a resistor 227 connected to a junction of one side of the parallel combination of a resistor 228 and a capacitor 229 and pin 3 of dual NAND gate 204. The other side of the parallel combination of resistor 228 and capacitor 229 connects to the base of transistor 214. The collector of transistor 214 is controlled by the circuit from terminal 7 to terminal 6 of secondary winding 106 of power transformer 101, a resistor 239 which connects to the anode of a diode 240. The cathode of diode 240 connects to the junction of terminal 6 of a secondary winding 138 of base drive transformer 117, the cathodes of a zener diode 243 and a diode 241 and a capacitor 242. The other side of the parallel combination of zener diode 243, diode 241 and capacitor 242 connects to ground. The other side of secondary winding 138 terminal 5 connects to the collector of transistor 214. The emitter of transistor 214 connects to ground.

Transistor 214 is biased "on" from 12.1V source supply, resistor 227, resistor 228, base of transistor 214 and emitter of transistor 214 to ground. Capacitor 229 charges through this circuit.

When pin 3 of dual NAND gate switches to ground, the current path through resistor 227 is now +12.1V, resistor 227, pin 3 of dual NAND gate 204, pin 4 to ground thereby shutting off transistor 214. Capacitor 229 discharges at this time decreasing the cut-off time of transistor 214. Just before transistor 214 shuts off, current is flowing through diode 241, winding 138 terminal 6, terminal 5, then through the collector of transistor 214 to ground. When transistor 214 shuts off, the voltage at terminal 5 of winding 138 becomes positive with respect to the voltage at terminal 6 because of the inductive energy in winding 138. This causes the voltage at FIG. 2 terminal 3 of winding 138 to become positive to the voltage at terminal 1, therefore, the energy stored in winding 138 is transferred to winding 136 turning switching transistor 115 on. When switching transistor 115 turns on, the current path through winding 118 reinforces and provides the base drive to winding 136 to keep switching transistor 115 in saturation. Switching transistor 115 stays on as long as the pin 3 output of dual NAND gate 204 is at ground. Switching transistor 115 being "on" delivers power to load 127 through power transformer 101 secondary winding 107. Switching transistor 115 shuts off in a manner similar to that described for the shut-off of switching transistor 116.

The output of dual NAND gate 204 pin 5 at ground controls the shutdown of transistor 213 and pin 3 at ground controls the shutdown of transistor 214.

The complete cycle operates as follows. The 40KHz trigger 202-3 starts one-shot 212 which switches pin 3 and pin 7 of one-shot 212 high. Pin 3 of one-shot 212 high allows capacitor 215 to charge. When pin 7 of one-shot 212 goes high setting pins 2 and 6 of dual NAND gate 204 high, then transistor 226 of dual NAND gate 204 conducts when the 20KHz 202-1 is high. Transistor 225 of dual NAND gate 204 conducts when the 20KHz 202-2 goes high. When transistor 225 conducts, pin 5 of dual NAND gate 204 goes to ground shutting off transistor 213. When transistor 226 conducts, pin 3 of dual NAND gate 204 goes to ground shutting off transistor 214.

When capacitor 215 is charged up sufficiently for the voltage at pin 6 of one-shot 212 to equal the voltage at pin 5 of one-shot 212, then pin 7 of one-shot 212 goes low, setting pins 2 and 6 of dual NAND gate 204 low, shutting off either transistor 225 or 226 of dual NAND gate 204. This raises the voltage of pin 3 or pin 5 allowing the appropriate transistor 213 or 214 to begin conducting again.

When pins 1 and 2 of dual NAND gate 204 are high, transistor 226 conducts and the circuit is completed from 12.1V service voltage, resistor 227 pin 3 of dual NAND gate 204, transistor 226, pin 4 to ground. This sets pin 3 of dual NAND gate 204 to ground cutting off transistor 214.

FIG. 4 202-1 shows the 20KHz square wave which appears at one leg of a NAND of dual NAND gate 204 pin 1. 202-2 shows the 20KHz square wave which appears at one leg of the other NAND Of dual NAND gate 204 pin 7. 202-3 shows the 40KHz trigger which starts capacitor 215 to charge when one-shot 212 pin 2 is pulsed by the negative going 40KHz trigger 202-3. 212-1 shows the voltage rise at one-shot 212 pin 6 as capacitor 215 charges. 212-2 (shaded area) shows the wave shape if the +5V load 127 voltage is low. 212-3 (shaded area) shows the wave shape if the +5V load is high. Wave shape 204-1 shows the power pulse width, that is the approximate time unrectified power is applied to load 127. 204-2 (shaded area) is greater for +5V load 127 voltage low and 204-3 (shaded area) is less for +5V load 127 voltage high. 204-10 shows the NAND output of 20KHz square wave 202-1 and the one-shot 212 output pin 7. 204-11 shows the NAND output of output square wave 20KHz and the one-shot 212 output pin 7. The rise and fall of 204-12 shows the low +5V load 127 voltage width and 204-13 shows the high +5V load 127 voltage width.

Wave shape 214-1 shows the voltage at the collector of transistor 214. Wave shape 213-1 shows the voltage at the collector of transistor 213 with 213-2 showing the off-time width during low +5V load 127 voltage and 212-3 showing the off-time width during high +5V load 127 voltage.

Wave shape 115-1 shows the collector current of switching transistor 115.

Wave shape 116-1 shows the collector current of switching transistor 116 with 116-2 showing the wave shape width for low +5V load 127 voltage and 116-3 showing the wave shape width for high +5V voltage. Potentiometer 217 in the charging circuit of capacitor 215 is adjusted for the 5 microseconds time at 25° C when both switching transistors are off under nominal conditions. If the 5 microsecond gap approaches zero, then large stresses are put on switching transistors 115 and 116 increasing probability of catastrophic transistor failure.

Wave shape 128 shows the load power pulses at the cathode of the rectifier diodes. 128-2 (shaded) shows low +5V load 127 voltage and 128-3 (shaded) shows high +5V load 127 voltage ripple 129 shows the +5V load 127 voltage after regulation.

Assuming that the +5V to load 127 is low, capacitor 215, FIG. 3 will charge for a longer time period until the pin 6 voltage of one-shot 212 equals the pin 5 voltage (less than 5V). Pulse 212-2 shows a pulse of longer duration. This results in a wider pulse 204-2 as the output of one-shot 212, pin 7, FIG. 3. As a result, pulse 204-12, FIG. 4, is wider causing transistor 213 to be off for the duration shown in pulse 213-2 causing switching transistor 116 to be on for the pulse period 116-2. This results in more energy provided load 127 since pulse 128-2 is wider.

Changes in ambient temperature can be followed through FIG. 4 in a similar manner by noting dotted line changes in 212-4 and 212-5. But again, the temperature affects on pulse width occur during power supply turn on before output voltages are in regulation, and during turn off after output voltages fall out of regulation and before the large power supply storage capacitors 113 and 114 of FIG. 2 are fully discharged.

Figure 5:
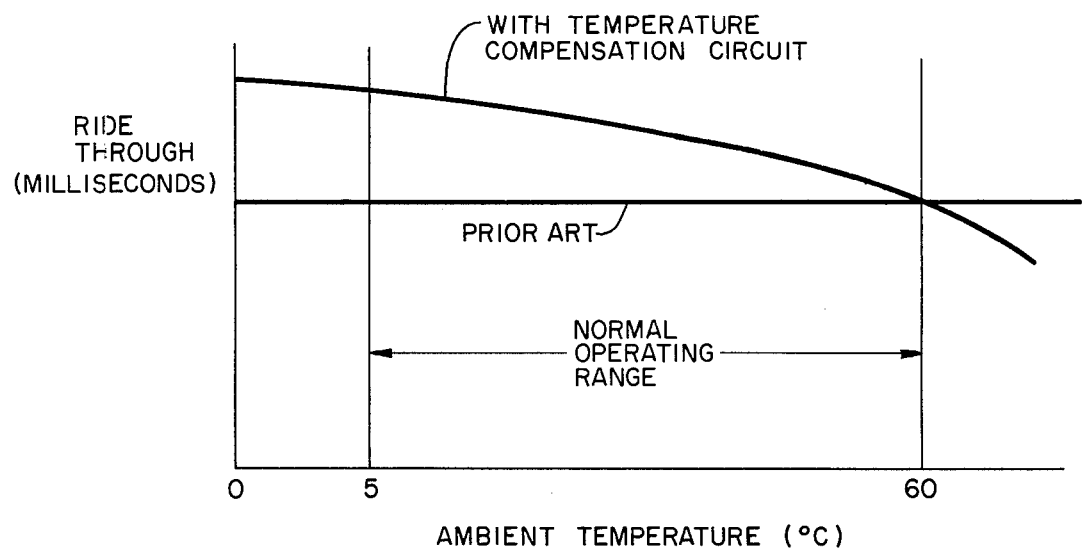
FIG. 5 illustrates the comparison with the prior art of ride through versus temperature.

FIG. 5 shows a curve of ride through in milliseconds versus ambient temperature. Ride through is the time the DC output power is on after the AC input power goes off. In the normal operating temperatures, the ride through with temperature compensation as described in this invention is greater than the prior art which is very desirable. In ambient temperature above the normal operating range, the ride through with temperature compensation is less than the prior art which is also desirable. At higher temperatures, storage, the rise and fall times of transistors greatly increase, possibly causing crossfire current spikes. The prior art circuitry causes stress provoking spikes under this condition of high ambient temperature which increases the rate of component catastrophic failure. This invention by decreasing the ride through, decreases the probability of stress provoking spikes by avoiding crossfire conditions in the circuitry thereby increasing component life.

Figure 6:
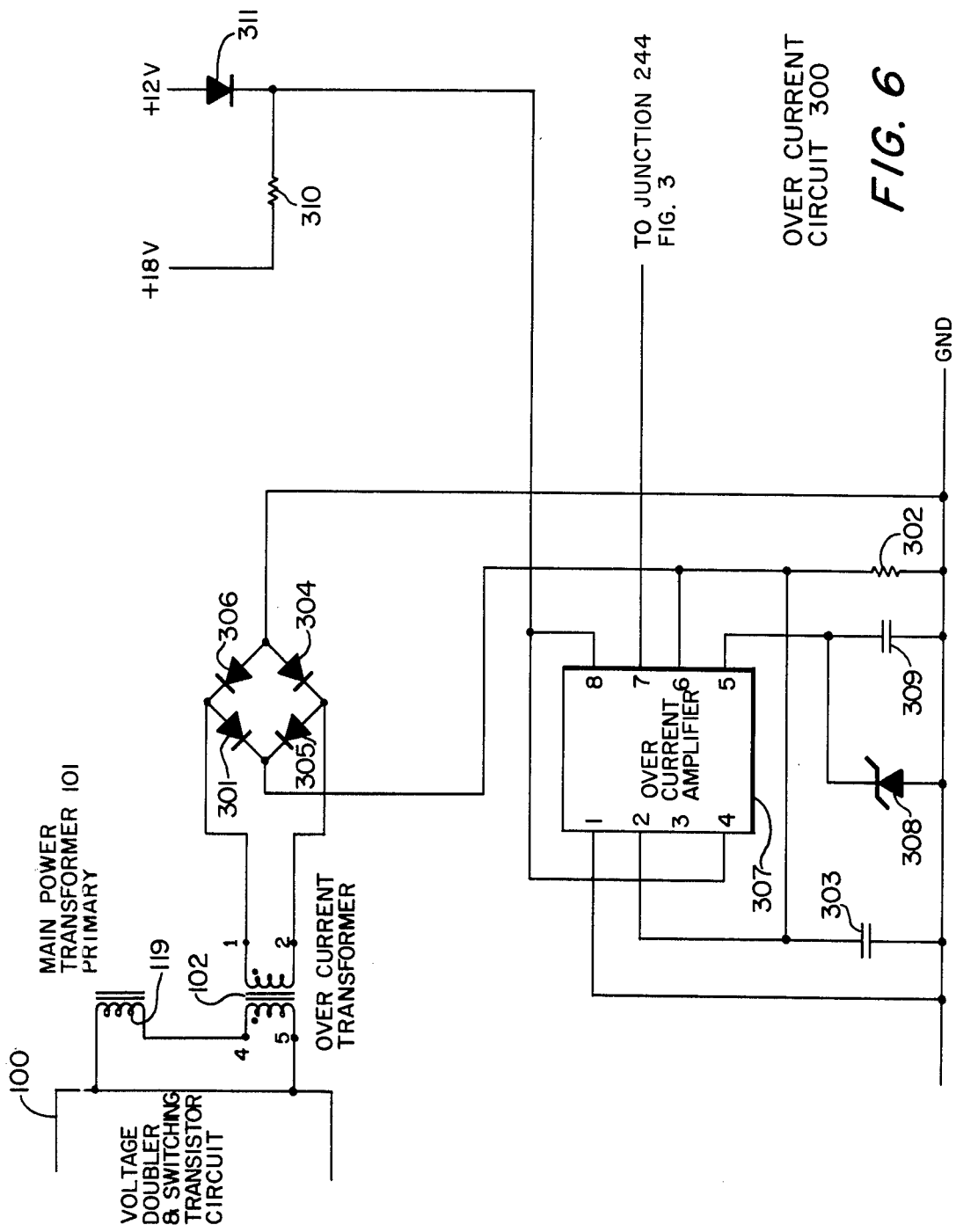
FIG. 6 illustrates the overcurrent circuits of FIG. 1.

FIG. 6 shows the overcurrent circuit 300. The primary winding 119 of main power transformer 101 is in series with the primary winding of the overcurrent transformer 102. The secondary winding circuit of overcurrent transformer 102 is connected as follows. Terminal 1 connects to the junction of a diode 306 cathode and a diode 301 anode. Terminal 2 connects to the junction of a diode 304 cathode and a diode 305 anode. The junction of the diode 306 anode and the diode 304 anode connects to ground. The junction of the diode 305 cathode and the diode 301 cathode connects to the junction of a resistor 302, a capacitor 303 and pins 6 and 2 of overcurrent amplifier 307. The other side of resistor 302 and capacitor 303 connects to ground. A capacitor 309 in parallel with the anode of a zener diode 308 connects between overcurrent amplifier 307, pin 5 and ground. Pin 1 connects to ground. Pins 4 and 8 connect to the junction of a resistor 310 and the cathode of a diode 311. Resistor 310 connects to +18V and diode 311 anode connects to +12V. Pin 7 connects to the junction of capacitor 234, the cathode of diode 233 and resistor 231.

Overcurrent amplifier 307 is a 555-2 amplifier that was described previously.

Overcurrent transformer primary winding 102 senses the current through the primary winding 119 of output transformer 101. The current is stepped down in the secondary winding of overcurrent transformer 102. When the voltage at terminal 1 is high, the circuit is completed through diode 301 and the parallel combination of resistor 302 and capacitor 303, diode 304 to terminal 2 of overcurrent transformer 102. When the voltage at terminal 2 is high, the circuit is completed through diode 305, the parallel combination of resistor 302 and capacitor 303, diode 306 to terminal 1. In both cases, the voltage drop across resistor 302 in parallel with capacitor 303 appears at pins 2 and 6 of overcurrent amplifier 307 and is proportional to load power. Overcurrent amplifier pin 5 is biased at 6.2V by zener diode 308. Capacitor 309 reduces the zener diode noise. If load power exceeds a predetermined value, the voltage at overcurrent amplifier 307, pins 2 and 6 exceeds the voltage at pin 5, thus pin 7 grounds junction 244 FIG. 3, discharging capacitor 234 FIG. 3. Normally, capacitor 234 is charged to 12.1V through resistor 231. Also, diode 233 is back biased. Capacitor 234 discharging sinks current out of pin 13 of P5V reference amplifier 205 through resistor 232 and diode 233. Pin 13 of the P5V reference amplifier 205 has a high output impedance and sinking current out of pin 13 and sets pin 10 of P5V reference amplifier 205 low setting pin 5 of one-shot 212 low. Then as capacitor 215 starts to charge when the 40KHz trigger 202-3 signal connected to pin 2 of one shot 212 goes low, pin 7 goes high almost immediately, keeping transistors 213 and 214 off for a very short time, turning switching transistors 115 and 116 on for a very short time. FIG. 4, 212-6, 204-6, 204-16, 214-6, 115, 6 and 128-6 show the greatly reduced power to load 127.

As the output power decreases, the current through the primary winding of overcurrent transformer 102 decreases, decreasing the voltage induced in the secondary winding of overcurrent transformer 102, decreasing the voltage across resistor 302 and capacitor 303 in parallel. This decreases the voltage at pins 2 and 6 of overcurrent amplifier 207 below the 6.2 volts of pin 5, switching pin 7 to open removing the ground on junction 244. This causes capacitor 234 FIG. 3 to charge to 12.1V through resistor 231. The DC voltage on capacitor 234 controls the maximum available power pulse width by sinking current out of pin 13 of the P5V reference amplifier 205 through resistor 232 and diode 233. Therefore, as capacitor 234 charges, the voltage at pin 10 of the P5V reference amplifier 205 rises gradually increasing the power pulse width to maintain the +5V load 127 voltage. This technique slowly increases the volt microsecond stress on main power transformer 101 and prevents collector current spikes in switching transistors 115 and 116 FIG. 2 thereby preventing the saturating of main power transformer 101.

Diode 311 and resistor 310 assure that the voltage on pins 4 and 8 of overcurrent amplifier 307 is operative in the event that the +12V supply is shorted to ground. In that event, current will flow from +15V, through resistor 310 to pins 4 and 8. Diode 311 is back biased at this time, blocking the current flow to the grounded +12V supply.

Figure 7:
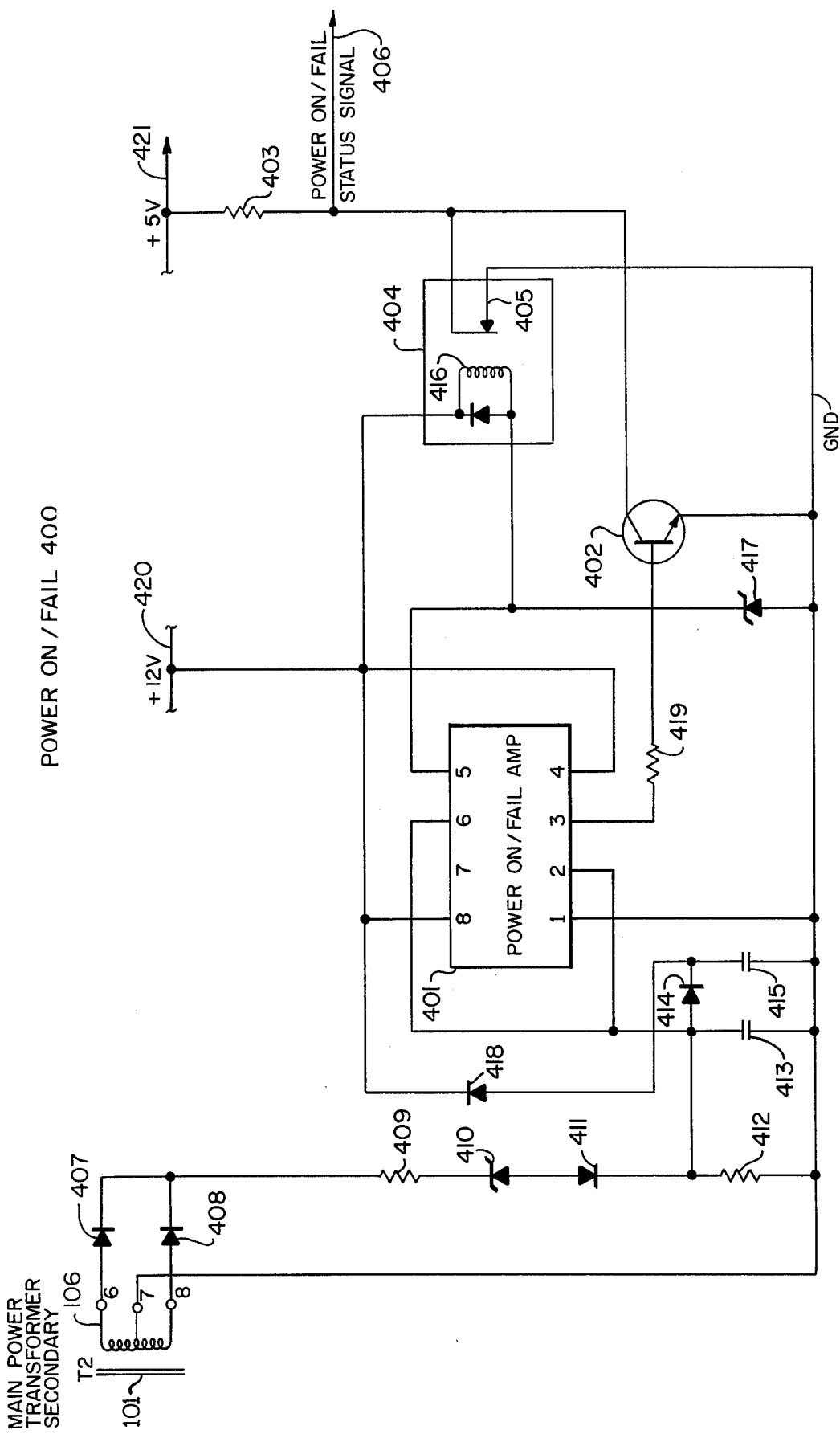
FIG. 7 illustrates the power on/fail circuits of FIG. 1.

FIG. 7 illustrates power on/fail circuit 400. Power on/fail signal 406 is a logic level which interrupts the digital computer. It is to be understood that electronic computer systems are in general equipped with appropriate logic which allows for an orderly shutdown upon receiving such a signal. Such logic does not form a part of this invention except insofar as being the recipient of the signal herein developed. This signal is at ground during power-up and power-down and is at +5 volts after all of the voltages are in regulation. During any AC input voltage outage, the power on/fail status signal 406 switching to ground tells the system to go into an orderly shutdown and guarantees at least two more milliseconds of DC power.

FIG. 2 shows the circuit which monitors the output of secondary winding 106 of power transformer 101 and rectifies this output through diodes 407 and 408.

In FIG. 7, the power on/fail circuit 400 is connected from terminal 6 of the secondary winding 106 of main power transformer 101 to the anode of diode 407. Terminal 8 connects to the anode of diode 405. Terminal 7 connects to ground. The cathodes of diodes 407 and 408 connect to a resistor 409 which connects to the cathode of a zener diode 410. The anode connects to the anode of a diode 411. The cathode connects to the junction of a resistor 412, a capacitor 413 and the anode of a diode 414. The cathode of diode 414 connects to a capacitor 415 and the anode of a diode 418. The other side of resistor 412 and capacitors 413 and 415 connect to ground. The cathode of diode 418 connects to the +12V 420 supply as do pins 4 and 8 of a power on/fail amplifier 401 which is a 555-2 timer that was described previously. Pin 1 connects to ground, pins 2 and 6 connect to the junction of resistor 412, capacitor 413, and diode 411. Pin 3 connects to a resistor 419 which connects to the base of a transistor 402. Pin 5 connects to one side of the coil of relay 404 and the cathode of zener diode 417. The anode connects to ground, and the other side of the coil of relay 416 connects to +12V 420. The emitter of transistor 402 connects to ground, the collector connects to the junction of one contact of the normally closed switch 405 of relay 404, a resistor 403 and power on/fail status signal 406. The other contact of normally closed switch 405 connects to ground. The other side of resistor 403 connects to the +5V supply.

Figure 8:
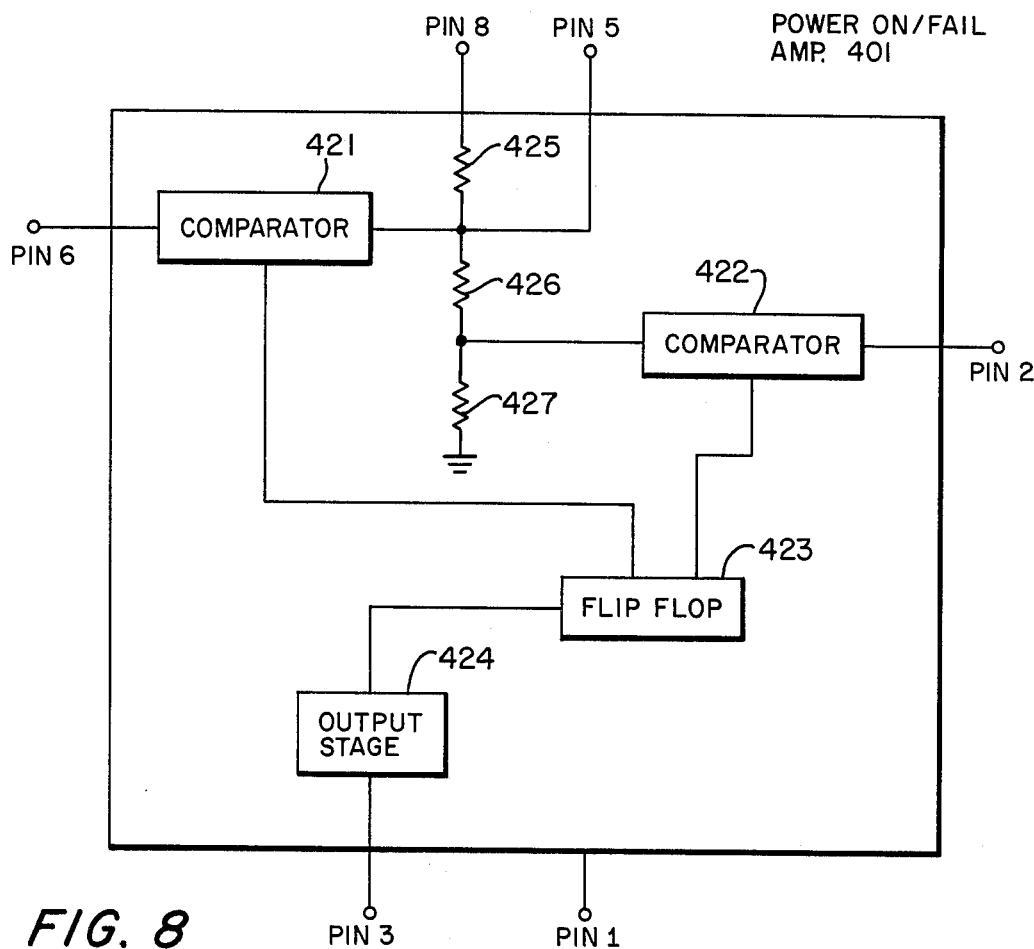
FIG. 8 illustrates the power on/fail amplifier circuit of FIG. 7.
Figure 9:
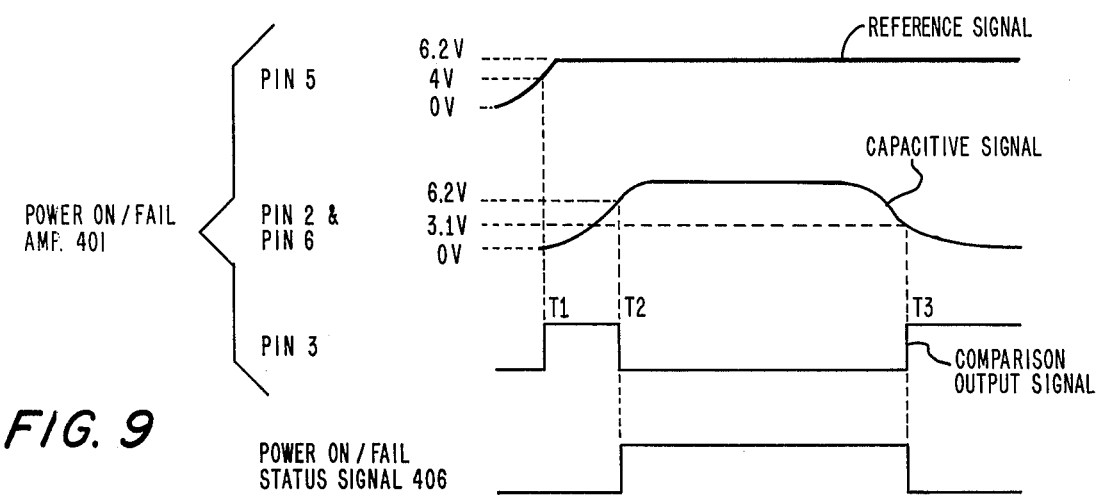
FIG. 9 illustrates the timing of the power on/fail circuits of FIG. 6.

FIG. 8 illustrates the power on/fail amplifier 401 which is a commercially available 555 timer which was previously described. FIG. 9 illustrates the timing relationships of the power on/fail amplifier 401 and the power on/fail status signal 406.

When the power supply system is turned on, normally closed contact 405 of relay 404 holds the power on/fail status signal 406 at ground. Then the +12V 420 of the ±12V voltage source 104 starts to rise and as the voltage at pin 8 of power on/fail amplifier 401 reaches +4V, which is the minimum operating voltage of the power on/fail amplifier 401, current flows from pin 3 of the power on/fail amplifier 401 through resistor 419 into the base of transistor 402, turning it on and holding the power on/fail status signal 406 at ground.

The pin 3 of power on/fail amplifier 412 is high whenever pin 5 is at a higher voltage than pin 6. In this case, zener 410 is back biased and prevents any flow of current through resistor 412 keeping pins 2 and 6 near ground potential. The circuit to pin 5 is completed from +12V 420 (+4V at this time), relay coil 416 pin 5, resistor 426 FIG. 8, resistor 427, to ground pin 1. This puts pin 5 at essentially 4V since resistors 426 and 427 have a high impedance relative to relay coil 416. The voltage of pin 5 higher than pin 6 results in an output from comparator 421 setting flip-flop 423 which sets the output stage 424, pin 3, high.

FIG. 9 shows pin 3 rising at $T_1$ time when the pin 5 voltage is approximately 4V. The circuit holding the power on/fail status signal at ground is +5V 421, resistor 403, collector of transistor 402, emitter to ground. Resistor 419 limits the transistor 402 base current.

When the +12V 420 reaches approximately 10V, relay 404 energizes from +12V 420, relay coil 416 zener diode 417 to ground. This opens normally closed contacts 405 of relay 404, however, the power on/fail status signal 406 remains at ground since transistor 402 still conducts. This circuit also clamps pin 5 to 6.2V by zener diode 417.

When the positive voltage at terminal 6 of secondary winding is above the breakdown voltage of zener 410, the circuit is completed through diode 407, resistor 409, zener diode 410, diode 411 and the parallel network of resistor 412 and capacitor 413 to terminal 7 of secondary winding 106. Capacitor 415 is also charging through diode 414. When the voltage across capacitors 413 and 415 reaches 6.2V, which appears at pins 2 and 6 of the power on/fail amplifier 401, then the output of pin 3 switches to ground turning transistor 402 off. This sets the power on/fail status signal 406 high through +5V 421 through pull-up resistor 403. In FIG. 8, pin 5 is now at 6.2V. When pin 6 goes greater than 6.2V, then the comparator 421 output resets flip-flop 423 setting pin 3 of output stage 424 low.

FIG. 9 shows pin 3 going low at $T_2$ time when pins 2 and 6 are at 6.2V setting the power on/fail status signal 406 high.

In the preferred embodiment, the time constants of the circuit are selected such that the +5V load voltage source 105 FIG. 1 is in regulation for at least 4 milliseconds before the power on/fail status signal 406 goes to +5V 421. Diode 414 and capacitor 415 increase the time constant of the network of resistor 412 and capacitor 413 during turn-on. Diode 414 blocks the discharge of capacitor 415. Diode 411 blocks the discharge of capacitor 413 during the half cycles that the secondary winding 106 is at ground. The zener diode 410 was selected at 22V to assure that with resistors 409 and 412 and diode 411, the power on/fail status signal 406 is issued during turn-on when the AC input voltage is as low as 100 volts. At AC input power failure, the power supply is operative as long as the AC input voltage is greater than 90 volts. During turn-off, be it deliberate by the operator or a power outage, the power on/fail status signal 406 will go to ground at least two milliseconds before the DC voltages lose regulation.

At loss of AC line power, capacitor 413 starts to discharge because the voltage across secondary winding 106 decreases. When the voltage across capacitor 413 reaches a lower value which is preferably set at 3.1V, pin 3 of the power on/fail amplifier 401 switches high turning on transistor 402 and pulling the power on/fail status signal 406 to ground. In FIG. 8, the pin 2 voltage is lowered and when it equals 3.1V, it compares with the pin 5 voltage of 6.2V, divided down by resistors 426 and 427 to 3.1V, causing the comparator 422 output to set flip-flop 423 setting the output stage 424, pin 3, high.

FIG. 9 shows pin 3 high at $T_3$ time when pins 2 and 6 are at 3.1V setting power on/fail status signal 406 low.

Diode 418 removes the charge from capacitor 415 when +12 volts 420 has discharged. The components are selected that the DC output voltages are in regulation for two milliseconds after the power on/fail status signal 406 goes to ground.

When the +12V 420 decays below 7V, relay 404 de-energizes releasing its normally closed contacts 405, clamping the power on/fail status signal 406 at ground. The leading and trailing edges of the power on/fail status signal 406 are guaranteed bounceless because transistor 402 controlled by power on/fail amplifier 401 has at least three volts of hysteresis and does all the voltage switching.

During turn-on, the power on/fail status signal 406 will be issued when the square wave voltage of secondary winding 106 is greater than V zener 417 (1 = R409/R412) + V zener 410 + 1.5V During turn-off, the power on/fail status signal will switch to ground when the square wave voltage of secondary winding 106 is less than V zener 417/2 (1 + R409/R412) + V zener 410 + 1.5V During turn-on, the capacitors 413 and 415 and the parallel combination of resistors 409 and 412 contribute to the 4 millisecond time between the DC voltages in regulation and the power on/fail status signal 406 transferring to +5V 421.

During turn-off, the discharge of capacitor 413 and the parallel combination of resistors 409 and 412 contribute to the 2 milliseconds that the DC voltages are in regulation after the power on/fail status signal 406 switches to ground.

The above circuits in conjunction with the capacitors 113 and 114 of FIG. 2 contribute to the aforementioned time intervals.

What is claimed is:

1. A power supply system for providing a signal to an electronic device indicative of the status of the power being supplied, said power supply system comprising:
   means for converting an AC voltage to a first DC voltage level;
   means for transforming the first DC voltage level to the low-level DC voltage;
   means for sensing the low-level DC voltage appearing at the output of said transforming means; and
   means, responsive to the sensing of the low-level DC voltage, for generating a status signal having a first signal level prior to the power supply system having been turned on and having a second signal level at such time as the sensed low-level DC voltage reaches a first predetermined voltage, and again having the first signal level if the sensed low-level DC voltage falls below a second predetermined voltage; said status signal generating means comprising:
   means for storing a voltage representative of the sensed low-level DC voltage;
   means for comparing the voltage representative of the sensed low-level DC voltage with at least two reference voltages; and
   means for defining the signal level of the status signal in response to the comparisons with reference voltages by said comparison means.

2. The power supply system of claim 1 wherein said comparison means comprises:
   a first circuit means for detecting when the voltage representative of the sensed low-level DC voltage equals a first reference voltage; and
   a second circuit means for detecting when the voltage representative of the sensed low-level DC voltage equals a second reference voltage substantially less than the first reference voltage.

3. The power supply system of claim 2 wherein the first reference voltage is at least twice that of the second reference voltage.

4. The power supply system of claim 2 wherein said means for defining the signal level of the status signal comprises:
   means for switching between the first and second signal levels of the status signal, said switching means being operative to switch to the second signal level in response to the output of said first circuit means, said switching means being operative to switch to the first signal level in response to the output of said second circuit means.

5. The power supply system of claim 4 wherein said means for defining the signal level of said status signal further comprises:
   means for initially maintaining the status signal at the first signal level when the power is initially turned on.

6. The power supply system of claim 2 wherein said comparison means further comprises:
   bistable means, connected to said first and second circuit means, said bistable means being in a first signal state when the voltage representative of the sensed low-level DC voltage equals the first reference voltage and being in a second state when the voltage representative of the sensed low-level DC voltage is less than the second reference voltage.

7. The power supply system of claim 6 wherein said bistable means is operative to be in the second signal state before the voltage representative of the sensed low-level DC voltage equals the first reference voltage.

8. The power supply system of claim 7 wherein said means for defining the signal level of the status signal comprises:
   means for switching between the first and second signal levels of the status signal, said switching means connected to said bistable means so as to switch to the second signal level in response to the bistable means being in the first signal state and switching to the first signal level in response to the bistable means being in the second signal state.

9. The power supply system of claim 1 wherein said means for storing the voltage representative of the sensed low-level DC voltage comprises:
   capacitive means connected to the output of said transforming means for slowly reflecting the sensed DC voltage.

10. The power supply system of claim 9 wherein said capacitive means connected to the output of said transforming means comprises:
    a pair of capacitors having a charge path wherein both capacitors are charged in parallel and having a discharge path wherein only one of said capacitors is initially discharged in response to a drop in the voltage at the output of said transforming means.

11. The power supply system of claim 10 wherein said pair of capacitors is operative to provide the signal representative of the sensed DC voltage when being charged and wherein only one of said capacitors provides the signal representative of the sensed DC voltage during discharge.

12. The power supply system of claim 1 wherein said status signal generating means further comprises:
    means for buffering said means for storing a voltage representative of the sensed low-level DC voltage from the output of said transforming means, said buffer means being operative to isolate said storage means during a predetermined voltage rise at the output of said transforming means.

13. The power supply system of claim 12 wherein said means for storing the voltage representative of the sensed low-level DC voltage comprises:
    a pair of capacitors having a charge path wherein both capacitors are charged in parallel and having a discharge path wherein only one of said capacitors is initially discharged, said pair of capacitors thereby being operative to reflect an increase in the voltage representative of the sensed low-level DC voltage at a slower rate than a decrease in the voltage representative of the sensed low-level DC voltage.

14. The power supply of claim 13 wherein said comparison means comprises:
    a first circuit means for detecting when the voltage representative of the sensed low-level DC voltage equals a first reference voltage; and
    a second circuit means for detecting when the voltage representative of the sensed low-level DC voltage equals a second reference voltage substantially less than the first reference voltage.

15. The power supply system of claim 14 wherein said means for defining the signal level of the status signal comprises:
   means for switching between the first and second signal levels of the status signal, said switching means being operative to switch to the second signal level in response to the output of said first circuit means, said switching means being operative to switch to the first signal level in response to the output of said second circuit means.

* * * * *